United States Patent
Chun

(10) Patent No.: US 10,807,583 B2
(45) Date of Patent: Oct. 20, 2020

(54) METHOD OF CONTROLLING AIR DRYER USING COMPRESSED AIR AND HEATERLESS AIR DRYER THEREOF

(71) Applicants: Hyundai Motor Company, Seoul (KR); Kia Motors Corporation, Seoul (KR)

(72) Inventor: Jong-Chul Chun, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 158 days.

(21) Appl. No.: 16/179,076

(22) Filed: Nov. 2, 2018

(65) Prior Publication Data

US 2019/0291707 A1 Sep. 26, 2019

(30) Foreign Application Priority Data

Mar. 22, 2018 (KR) ........................ 10-2018-0033438

(51) Int. Cl.
| | |
|---|---|
| *F26B 5/04* | (2006.01) |
| *B60T 17/02* | (2006.01) |
| *B60T 17/00* | (2006.01) |
| *B01D 53/04* | (2006.01) |
| *F15B 21/048* | (2019.01) |
| *B01D 53/26* | (2006.01) |
| *F04B 39/16* | (2006.01) |

(52) U.S. Cl.
CPC .......... *B60T 17/02* (2013.01); *B01D 53/0454* (2013.01); *B60T 17/004* (2013.01); *B60T 17/006* (2013.01); *F15B 21/048* (2013.01); *B01D 53/261* (2013.01); *B01D 2259/4566* (2013.01); *F04B 39/16* (2013.01)

(58) Field of Classification Search
CPC ...... B60T 17/02; B60T 17/006; B60T 17/004; B01D 53/0454; B01D 53/261; B01D 53/26; B01D 2259/4566; B01D 2257/80; F15B 21/048; F15B 21/0427; F15B 21/045; F15B 21/04; F15B 21/041; F15B 2211/6658; F15B 2211/6336; F15B 2211/6309; F15B 2211/6343; F15B 2211/66; F15B 2211/8855; F15B 2211/85; F04B 39/16
USPC ......................................................... 34/406
See application file for complete search history.

(56) References Cited

U.S. PATENT DOCUMENTS

2015/0052861 A1* 2/2015 Sugio ................. B01D 45/08
                                                            55/434.2
2017/0165605 A1* 6/2017 Minato ................. B60T 17/004

FOREIGN PATENT DOCUMENTS

KR 10-2014-0074702 A 6/2014

* cited by examiner

*Primary Examiner* — John P McCormack
(74) *Attorney, Agent, or Firm* — Morgan, Lewis & Bockius LLP

(57) ABSTRACT

An air dryer control method may include a cold mode in which a controller performs a winter season condition control in which air temperature is lowered to freezing temperature if an engine starting is detected, and performs a winter season thawing control in which compressed air introduced into a valve control of an air dryer warms a purge valve of the air dryer.

11 Claims, 7 Drawing Sheets

METHOD OF CONTROLLING AIR DRYER USING COMPRESSED AIR AND HEATERLESS AIR DRYER THEREOF

CROSS-REFERENCE TO RELATED APPLICATION

The present application claims priority to Korean Patent Application No. 10-2018-0033438, filed on Mar. 22, 2018, the entire contents of which is incorporated herein for all purposes by this reference.

BACKGROUND OF THE INVENTION

Field of the Invention

The present invention relates to an air dryer for a vehicle, and more particularly, to a heaterless air dryer configured for controlling an air dryer using compressed air for raising an internal temperature of the air dryer without a separate heating element.

Description of Related Art

Generally, a commercial vehicle has an air management system for generating and using compressed air used as an energy source, in which the air management system has an air dryer as a main component.

For example, the air management system may include an air compressor for generating compressed air, an oil removing device configured for removing foreign matters (oil, moisture) coming from the air compressor in a centrifugal separation manner, an air dryer for removing foreign matters (oil, moisture) coming from the air compressor in an adsorption manner, an air tank for maintaining and managing the compressed air from which oil and moisture is purified, and an electronic air processing unit (EAPU) for controlling an operation to implement a filling mode (filling the air tank) and a regeneration mode (regenerating a cartridge for recovering an air dryer dehumidifying function).

The air dryer receives the compressed air of the air compressor through the oil removing device, and accumulates vaporized engine oil, which is air compressor operating oil which is not filtered from the received compressed air by the oil removing device, in an emulsion (mixture of water with oil) form. In the instant case, the engine oil adversely affects a rubber product inside the air dryer to damage the rubber product, such that the life span of the expensive air dryer is lowered.

To the present end, the air dryer is provided with a heater for raising internal temperature along with a plurality of valves (for example, MV1 and MV2) for switching a path of the compressed air. Therefore, the air dryer forms an operation mode (filling mode/regeneration mode/PR mode) between the air compressor and the air tank by opening or closing the MV1 valve and the MV2 valve and thawing a purge valve by the operation of the heater in winter.

However, the air dryer cannot but have the following disadvantages due to the MV1/MV2 valve and the heater.

First, in terms of the valve operation efficiency, the MV1 valve operation requires the unfilled mode conversion of the air compressor, the MV2 valve operation requires the simultaneous operation of the cartridge regeneration, the purge valve, and the oil removing device, and the MV1 valve operation is required for the MV2 valve operation since the MV2 valve cannot be controlled separately. As the result, the valve cannot but lower the efficiency of the mode switching control of the air dryer.

Second, in terms of the heater starting efficiency, the operation of the purge valve before the complete thawing of the purge valve in winter may damage the rubber parts for airtightness, which may lead to air leakage and shortening the life span of the air dryer. As the result, the heater cannot but lower the efficiency of the thawing control of the air dryer in winter.

Third, in terms of the cartridge regeneration efficiency, it is not possible to apply an effect of blowing out foreign matters, such as the emulsion accumulated in the lower portion of the cartridge of the air dryer, by the compressed air generated from the air compressor during the valve operation.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air dryer control method using compressed air and a heaterless air dryer thereof configured for performing a new cold mode in an air dryer itself together with an existing regeneration mode by independently forming an air switching path using a valve layout inside the air dryer, configured for using the compressed air discharging even an emulsion of a cartridge in a regeneration mode while removing a heater by use of the compressed air for thawing of a purge valve in winter.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, an air dryer control method may include: a cold mode in which a controller performs a winter season condition control in which air temperature is lowered to freezing temperature if an engine starting is detected, and performs a winter season thawing control in which compressed air introduced into a valve control of an air dryer warms a purge valve of the air dryer.

The compressed air may be high-temperature/high-pressure compressed air filled in an air tank via the air dryer.

The winter season condition control may be performed by detecting an air pressure, air temperature, and an engine revolution per minute (RPM) as winter season condition factors after engine starting, determining a winter season thawing control entry for the winter season thawing control at the air temperature, and determining the winter season thawing control entry as an engine OFF elapsed time before the engine starting is detected.

The engine OFF elapsed time may be determined after the air temperature satisfies the winter season thawing control entry.

The air temperature may be compared with a threshold confirming the freezing temperature and may be temperature lower than the threshold.

The engine OFF elapsed time may be compared with a threshold set by counting a timer time and may be equal to or greater than the threshold.

The winter season thawing control may divide the air temperature detected after the engine starting by the threshold, and perform a winter season repeating operation control when the air temperature is higher than the threshold but perform a cold weather repeating operation control when the air temperature is equal to or lower than the threshold.

Each of the winter season repeating operation control and the cold weather repeating operation control may be performed by being including a CUT-OUT filling section control which raises the pressure of the compressed air to a CUT-OUT pressure at which the filling of the air tank stops and a CUT-IN consumption section control which drops the pressure of the compressed air to a CUT-IN pressure at which the filling of the air tank starts.

The CUT-OUT filling section control may control the MV1 valve, the MV2 valve, and the MV3 valve of the air dryer to be turned off to switch an air path and may be performed until an air pressure detection value reaches the CUT-OUT pressure, and the CUT-IN consumption section control may switch the MV1 valve and the MV2 valve to be turned on but control the MV3 valve to be turned off to switch the air path and may be performed until the air pressure detection value reaches the CUT-IN pressure before an elapsed time after the engine starting at the time of detecting the engine starting reaches the threshold.

The winter season repeating operation control and the cold weather repeating operation control for the CUT-IN consumption section control may have a difference in the elapsed time after the engine starting.

The elapsed time after the engine starting may be longer in the cold weather repeating operation control than in the winter season repeating operation control.

If the elapsed time after the engine starting reaches the threshold, a regeneration mode for the air dryer may be performed.

In accordance with various exemplary embodiments of the present invention, an air dryer may include: a path switching valve configured to be including an MV1 valve, an MV2 valve, and an MV3 valve; and an air path configured to include a valve-oil removing device line connected to the MV3 valve while being connected to the MV1 valve and the MV3 valve, a valve-air compressor line configured to connect the MV1 valve, a valve-cartridge line configured to connect the MV2 valve to a cartridge removing foreign matters and a purge valve performing a purge operation, and a purge valve line configured to connect the MV3 valve to the purge valve, and form a flow of high-temperature/high-pressure compressed air.

Each of the MV1 valve, the MV2 valve, and the MV3 valve may be a solenoid valve.

A turn on/off control for each of the MV1 valve, the MV2 valve, and the MV3 valve may form path switching which changes the flow of compressed air through the air path, and a cold mode which warms the purge valve, a regeneration mode which blows out emulsion accumulated at a bottom portion of the cartridge by the compressed air, and a filling mode which fills the compressed air in an air tank may be performed by the path switching.

The cold mode may form the path switching which raises the pressure of the compressed air to a CUT-OUT pressure stopping a filling of an air tank by turning off the MV1 valve, the MV2 valve, and the MV3 valve, and form the path switching which drops the pressure of the compressed air to a CUT-IN pressure starting the filling of the air tank by turning on the MV1 valve and the MV2 valve and turning off the MV3 valve.

The regeneration mode may form the path switching by turning on the MV1 valve, the MV2 valve, and the MV3 valve.

The filling mode may form the path switching by turning off the MV1 valve, the MV2 valve, and the MV3 valve.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
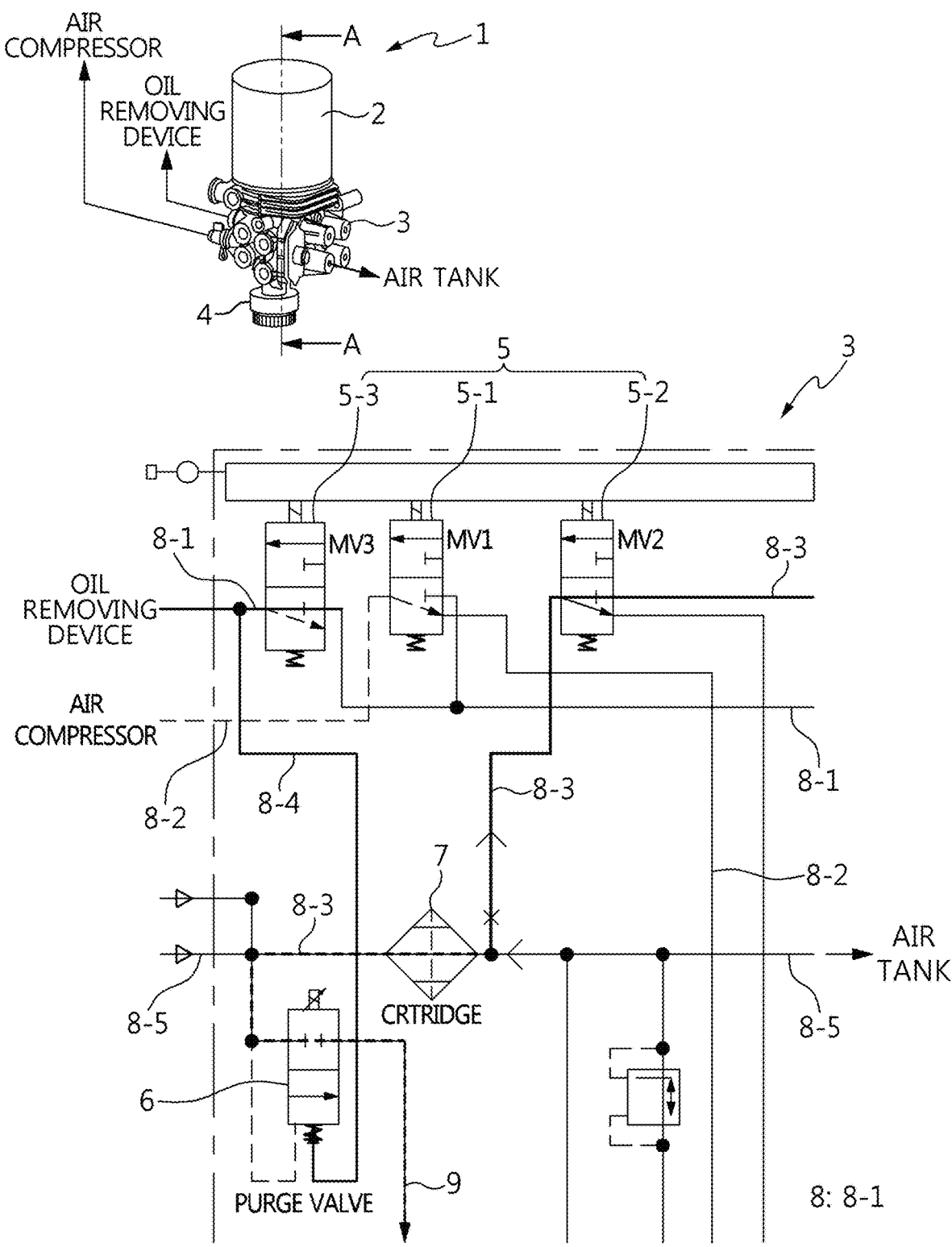
FIG. 1 is a schematic diagram of a heaterless air dryer configured for controlling an air dryer using compressed air according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings and these embodiments may be implemented in various forms by a person having ordinary skill in the art to which the present invention pertains and therefore the present invention is not limited to the exemplary embodiments described herein.

Referring to FIG. 1, the air dryer 1 illustrates a heaterless air dryer configured for using compressed air instead of using a heating element such as a heater for an air dryer control having a cold mode (S20).

The air dryer 1 includes a dryer body 2, a port body 3, and a drain port 4, which form an appearance, and includes a path switching valve 5 and a purge valve 6 which forms an internal circuit, a cartridge 7, an air path 8, and a drain line 9. In the instant case, the air dryer 1 includes a plurality of components necessary for the operation of the air dryer, but the expression and description thereof are omitted because a direct connection structure of these components for the air dryer control using the compressed air is weak.

The dryer body 2 forms an internal circuit for a flow of the compressed air. The port body 3 is configured as a path connected to external devices (for example, an air compressor 20, an oil removing device 30, and an air tank 40 in FIG. 2) so that the compressed air enters or exits the dryer body 2. The drain port 4 is configured as a path for discharging the compressed air to the outside together with foreign matters such as emulsion.

The path switching valve 5 forms an internal electric circuit of the dryer body 2, and is a solenoid valve including an MV1 valve 5-1, an MV2 valve 5-2, and an MV3 valve 5-3, and operates by use of a control signal of a controller 50 (see FIG. 4) as an electric signal. The MV1 valve 5-1 is involved in the control of the compressed air for the air compressor 20 (see FIG. 2), the MV2 valve 5-2 is involved in a regeneration control of the cartridge 7, and the MV3 valve 5-3 is involved in the control of the compressed air for the oil removing device 30 (see FIG. 3) together with an opening/closing control of the purge valve 6.

Therefore, a turn on (i.e., opening) of the MV1 valve 5-1 and the MV2 valve 5-2 and a turn off (i.e., closing) of the MV3 valve 5-3 are involved in a cold mode of the air dryer 1. The turn on (i.e., opening) of the MV1 valve 5-1, the MV2 valve 5-2, and the MV3 valve 5-3 is involved in a regeneration mode of the air dryer 1. The turn off (i.e., closing) of the MV1 valve 5-1, the MV2 valve 5-2, and the MV3 valve 5-3 is involved in a filling mode of the air dryer 1.

The purge valve 6 is a solenoid valve that forms the internal electric circuit of the dryer body 2 and utilizes a control signal of the controller 50 (see FIG. 4) as an electrical signal to perform purging for the air dryer 1. The cartridge 7 is provided inside the dryer body 2 to remove foreign matters.

The air path 8 forms an internal air path of the dryer body 2, and includes a valve-oil removing device line 8-1, a valve-air compressor line 8-2, a valve-cartridge line 8-3, a purge valve line 8-4, and an air tank line 8-5. The valve-oil removing device line 8-1 connects the MV1 valve 5-1 to the MV3 valve 5-3, and is connected from the MV3 valve 5-3 to the oil removing device 30 (see FIG. 4). The valve-air compressor line 8-2 connects the MV1 valve 5-1 and is connected to the air compressor 20 (see FIG. 4). The valve-cartridge line 8-3 connects the MV2 valve 5-2 to the cartridge 7 and the purge valve 6 and is connected to the drain line 9. The purge valve line 8-4 connects the purge valve 6 to the MV3 valve 5-3. The purge valve line 8-4 is branched from the valve-oil remover line 8-1 which exits the MV3 valve 5-3, and is connected to the purge valve 6. The air tank line 8-5 is connected to the air tank 40 (see FIG. 4).

Therefore, the valve-air compressor line 8-2 and the valve-cartridge line 8-3 form the cold mode of the air dryer 1 by turning on (i.e., opening) the MV1 valve 5-1 and the MV2 valve 5-2 and turning off (i.e., closing) the MV3 valve 5-3. The valve-oil removing device line 8-1, the valve-air compressor line 8-2, and the purge valve line 8-4 form the regeneration mode of the air dryer 1 by turning on (i.e., opening) the MV1 valve 5-1 and the MV3 valve 5-2 and turning off (i.e., closing) the MV3 valve 5-3. The air tank line 8-5 forms the filling mode of the air dryer 1 by turning off (i.e., closing) the MV1 valve 5-1, the MV2 valve 5-2, and the MV3 valve 5-3.

The drain line 9 is configured as a path for discharging emulsion accumulated inside the driver body 2 to the outside while blowing out the emulsion by the blowing effect of the compressed air in the regeneration mode of the air dryer 1. In the instant case, the effects of blowing out the compressed air applies the compressed air to the purge valve 6 through the purge valve line 8-4 by turning off (i.e., closing) the MV1 valve 5-1 and the MV2 valve 5-2 and turning on (i.e., opening) the MV3 valve 5-3 to connect the valve-cartridge line 8-3 branched from the cartridge 7 to the drain line 9.

Figure 2:
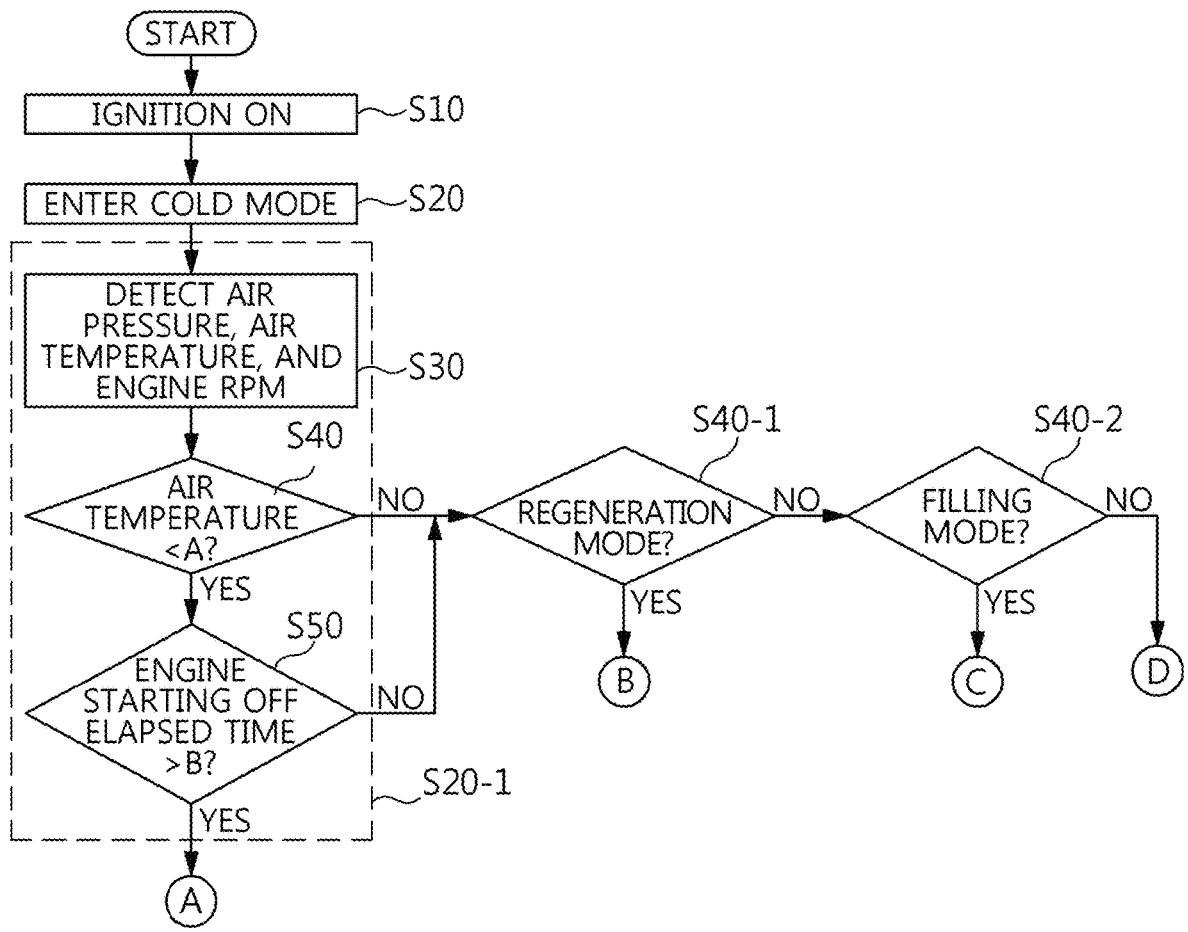
FIG. 2 and FIG. 3 are flowcharts of an air dryer control method using compressed air according to an exemplary embodiment of the present invention.
Figure 3:
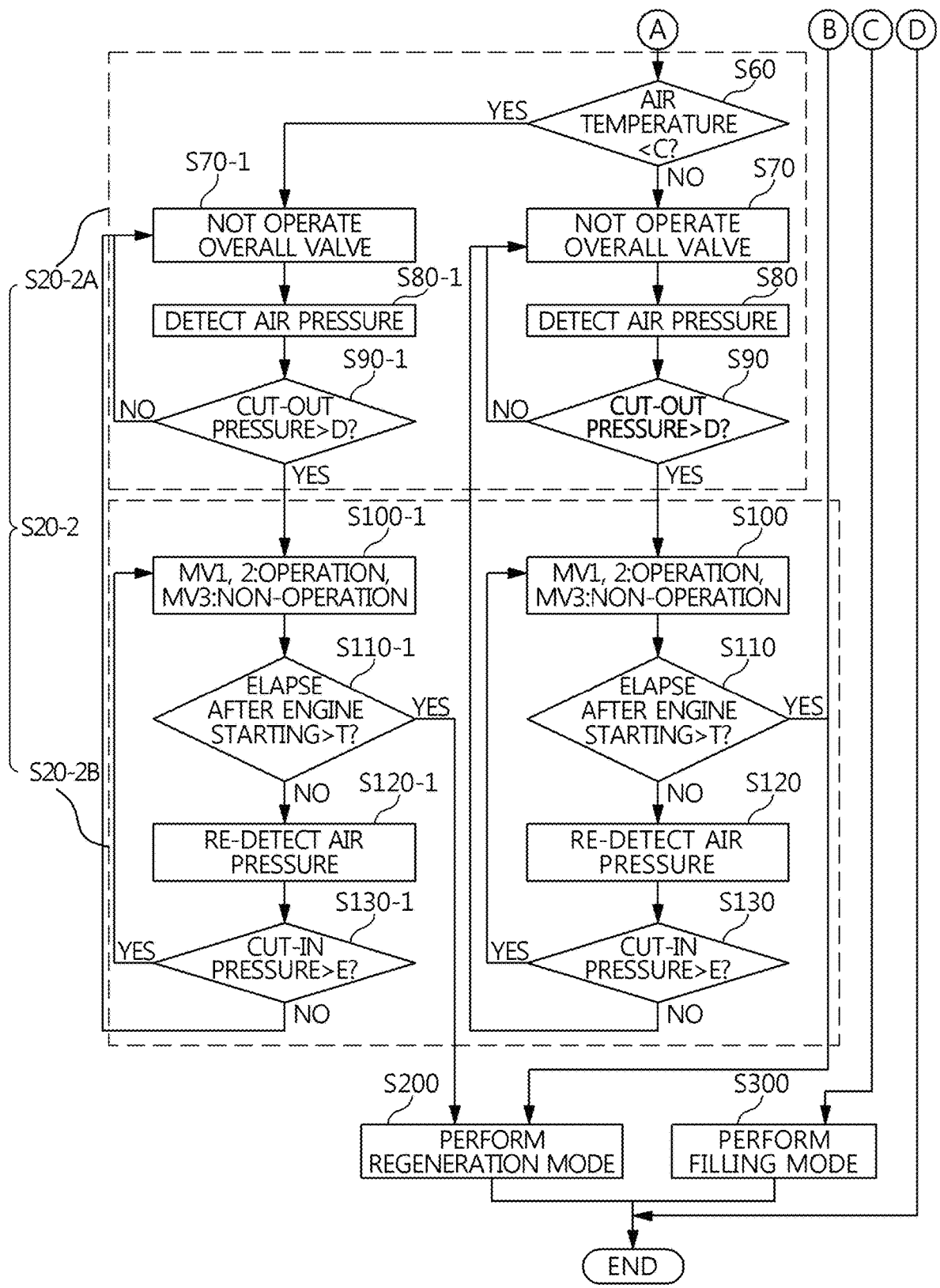

Referring to FIG. 2 and FIG. 3, the air dryer control method enters the cold mode (S20) by an ignition ON (S10) to confirm a winter season condition control (S20-1), preferentially performing a winter season thawing control (S20-2), and then performs the regeneration mode (S200) in which an effect of blowing out the emulsion inside the air dryer is performed. However, except for the winter season in which the winter season condition control (S20-1) is not performed, the air dryer control method is switched to perform a regeneration mode (S40-1, S200) or a filling mode (S40-2, S200) without performing the cold mode.

The air dryer control method performs the repetition operation in which the winter season thawing control (S20-2) of the cold mode (S20) includes a CUT-OUT filling control (S20-2A) and a CUT-IN consumption control (S20-2B). In the instant case, when a dynamic safe pressure of the air tank 40 (see FIG. 3) is set to be 6.0±0.3 bars, the CUT-OUT pressure is 9.7±0.3 bars and the CUT-IN pressure is 8.3±0.3 bars.

As a result, the air dryer control method realizes the air dryer control using high-temperature/high-pressure compressed air filled in the air tank, and utilizes the compressed air to protect rubber (for example, packing or O-ring) of the oil removing device as well as parts in the air dryer and rubber (for example, packing or O-ring) of the purge valve while improving or resolving the reduction in the winter season thawing control efficiency of the air dryer due to the heater which occurs in the existing scheme using the heating element such as the heater for the winter season thawing control and the loss of the emulsion discharge function of a lower end portion of the cartridge in the air dryer. Furthermore, the use of the compressed air in the air dryer control improves or resolves the reduction in the mode switching control efficiency of the air dryer which occurs in the existing scheme using two MV1/MV2 valves.

Figure 4:
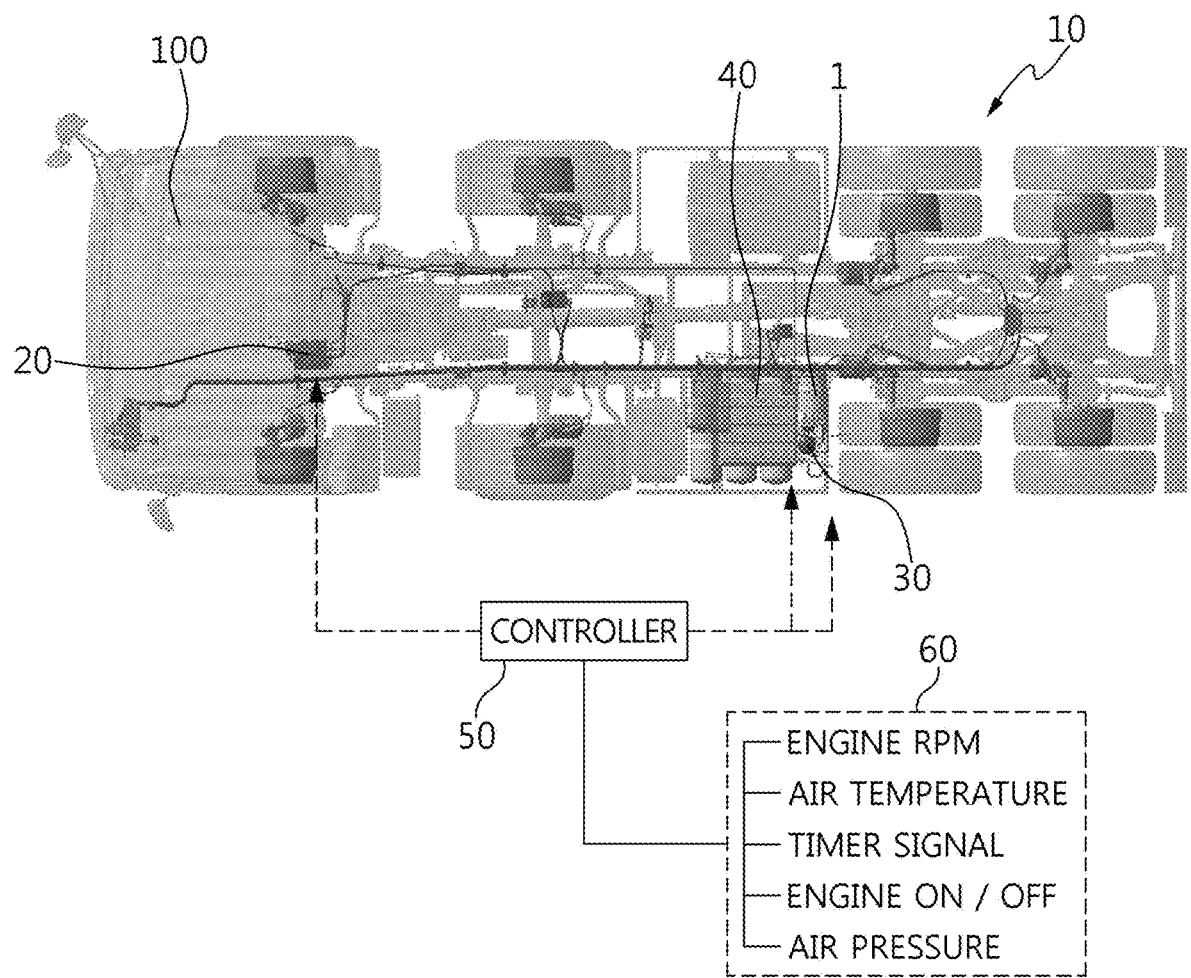
FIG. 4 is a schematic diagram of an air management system to which a heaterless air dryer according to an exemplary embodiment of the present invention is applied.

FIG. 4 shows an example of the air management system 10 provided in a vehicle 100.

As shown in FIG. 4, the air management system 10 includes the air dryer 1, the air compressor 20, the oil removing device 30, and the air tank 40 as basic components, and a controller 50, which is connected to a sensor, as a control element.

The air dryer 1 has the driver body 2, the port body 3, and the drain port 4 as external components, and the path switching valve 5 including the MV1 valve 5-1, the MV2 valve 5-2, and the MV3 valve 5-2, the purge valve 6, the cartridge 7, an air path 8 including the valve-oil removing device line 8-1, the valve-air compressor line 8-2, the valve-cartridge line 8-3, the purge valve line 8-4, and the air tank line 8-5, and the drain line 9 as internal circuit components. However, the air dryer 1 is connected to the air compressor 20, the oil removing device 30, and the air tank 40, respectively, via the port body 3, and is configured as an assembly together with the air tank 40. Therefore, the air dryer 1 is connected to the air compressor 20 and the oil removing device 30 to remove foreign matters (oil, moisture) coming from the air compressor in an adsorption manner and then delivers the compressed air to the air tank 40.

The air compressor 20 generates the high-temperature/high-pressure compressed air. The oil removing device 30 removes foreign matters (oil, water) coming from the air compressor in a centrifugal separation manner and delivers the compressed air to the air dryer 1. The air tank 40 removes the oil and moisture included in the generated compressed air and maintains and manages the purified compressed air.

The controller 50 processes the detected value of the sensor 60 as input information to control the air dryer 1, the air compressor 20, and the air tank 40, and performs the filling mode for filling the compressed air, the regeneration mode for blowing out the emulsion along with regenerating the cartridge 7, and the cold mode for thawing the purge valve 6. When the dynamic safety pressure of the air tank 40 is set to 6.0±0.3 bar, the controller 50 sets the CUT-IN pressure, which is a restarting pressure for starting the air tank filling, to 8.3±0.3 bars while setting the CUT-OUT pressure, which is a stoppage pressure for stopping the filling of the air tank, to 9.7±0.3 bar. Therefore, the controller 50 removes the oil and moisture included in the compressed air generated in the air tank 40 to control the purified compressed air to be maintained and managed.

The sensor 60 includes an engine sensor for detecting engine revolution per minute (RPM), a temperature sensor for detecting an external temperature (i.e., air), and an air pressure sensor for detecting the pressure of the compressed air in the air tank 40, and includes an engine ON/OFF signal according to ignition on/off and a timer signal for counting a timer time.

The vehicle 100 is a commercial vehicle that utilizes compressed air as an energy source.

Hereinafter, the air dryer control method of FIG. 2 and FIG. 3 will be described in detail with reference to FIG. 4, FIG. 5, FIG. 6, and FIG. 7. In the instant case, the control subject is the controller 50, and the control target is the air management system 10, but is restrictively referred to as the operation of the air dryer 1.

The controller 50 enters the cold mode of S20 when the engine is turned on by the ignition ON of S10 and performs the winter season condition control of S20-1 according to the entry of the cold mode S20.

The winter season condition control (S20-1) includes a winter season condition factor detecting step (S30), an air temperature determining step (S40), and an engine off elapsed time determining step (S50).

For example, in the winter season condition factor determining step (S30), an air pressure detection value of the air pressure sensor for detecting the pressure of the compressed air of the air tank 40, an air temperature detection value of the temperature sensor for detecting an external temperature, and an engine RPM detection value of the engine sensor for detecting an engine speed are read.

For example, among the detected winter season condition factors in the air temperature determining step (S40), the air temperature detection value is used. To the present end, the following freezing temperature determination formula is applied.

Freezing temperature determination formula: air temperature<A

Here, the "air temperature" is the air temperature detection value, and the "A" is a threshold and is applied by use of 0° C. as a freezing temperature.

As a result, when the air temperature is higher 0° C., the air dryer 1 is in the state of the external temperature (i.e., air) at which the air dryer 1 need not be thawed, and therefore is switched to the regeneration mode (S40-1, S200) or the filling mode (S40-2, S200) in accordance with the condition, whereas if the air temperature is 0° C. or less, the air dryer control method enters the engine OFF elapsed time determining step (S50).

In the engine OFF elapsed time determining step (S50), it is determined that the timer time is counted. To the present end, the following engine off elapsed determination formula is applied.

Engine OFF elapsed determination formula: Timer time>B

Here, the "timer time" is the elapsed time of engine OFF of the engine stop before the ignition ON, and the "B" applies about 15 minutes as a threshold.

As a result, if the timer is less than 15 minutes, the engine is warmed and thus there is no need to thaw the air dryer 1. Therefore, the air dryer is switched to the regeneration mode (S40-1, S200) or the filling mode (S40-2, S200), whereas if the timer time is equal to or greater than 15 minutes, the air dryer enters the winter season thawing control of S20-2.

The controller 50 continuously performs a CUT-OUT filling section control (S20-2A) and a CUT-IN consumption section control (S20-2B) in which the winter season thawing control (S20-2) is divided by the air temperature, performing the repeated operation of the air tank 40 by the CUT-OUT pressure and the CUT-IN pressure. The CUT-OUT filling section control (S20-2A) and the CUT-IN consumption section control (S20-2B) include a winter season repeating operation control of S70 to S130 and a cold weather repeating operation control of S70-1 to S130-1 based on the air temperature re-determining step of S60.

For example, in the re-determining of the air temperature (S60), the air temperature detection value among the detected winter season condition factors is used. To the present end, the following winter season determination formula is applied.

Winter season determination formula: Air temperature<C

Here, the "air temperature" is the air temperature detection value, and the "C" is applies about −10° C. as a threshold.

As a result, when the air temperature detection value is higher than −10° C., the CUT-OUT filling section control (S20-2A) and the CUT-IN consumption section control (S20-2B) are performed by the winter season repeating operation control of S70 to S130, whereas if the air temperature detection value is equal to or lower than −10° C., the CUT-OUT filling section control (S20-2A) and the CUT-IN consumption section control (S20-2B) are performed by the cold weather repeating operation control of S70-1 to S130-1.

For the winter season repeating operation control (S70 to S130), the controller 50 divides the CUT-OUT filling section control (S20-2A) into a valve non-operating step of S70, an air pressure detecting step of S80, and a CUT-OUT pressure determining step of S90, and divides the CUT-IN consumption section control (S20-2B) into a valve operating step of S100, an engine state determining step of S110, an air pressure re-detecting step of S120, and a CUT-IN pressure determining step of S130.

For example, in the valve non-operating step S70, the MV1 valve 5-1, the MV2 valve 5-2, and the MV3 valve 5-3 are all kept OFF. In the air pressure detecting step (S80), the air pressure of the air tank 40 is detected. In the CUT-OUT pressure determining step (S90), the detected pressure of the air tank is used. To the present end, the following CUT-OUT pressure determination formula is applied.

CUT-OUT pressure determination formula: Pressure of air tank>D

Here, the "pressure of the air tank" is the detected pressure of the air tank, and the "D" applies about 9.7 bars as a threshold.

As a result, when the detected pressure of the air tank is lower than 9.7 bar, the valve non-operating step (S70), the air pressure detecting step (S80), and the CUT-OUT pressure determining step (S90) are repeated, whereas when the detected pressure of the air tank is higher than 9.7 bar, the air dryer control method enters the valve operating step (S100) and the air dryer is switched to the CUT-IN consumption section control (S20-2B).

For example, in the valve non-operating step S70, the MV1 valve 5-1 and the MV2 valve 5-2 are switched to ON, and the MV3 valve 5-3 are kept OFF. In the engine state determining step (S110), the determination is made by counting the timer time and thus the temperature rise of the engine coolant is reflected. In the air pressure re-detecting step (S80), the air pressure of the air tank 40 is re-detected. In the CUT-IN pressure determining step (S130), the arrival of the CUT-IN pressure is determined by use of the re-detection air tank pressure.

in the engine state determining step (S110), the determination is made by counting the timer time with respect to the time after the engine starting. To the present end, the elapse determination formula is applied after the engine starting.

Elapsed time determination formula after engine starting: Timer time>T

Here, the "timer time" is the sustain time of engine ON of the engine stop after the ignition ON, and the "T" applies about 300 seconds as a threshold.

CUT-OUT Pressure determination formula: Air tank pressure>D

As a result, if the timer time is equal to or more than 300 seconds, the engine is sufficiently warmed and thus the thawing of the air dryer 1 is not needed, such that the air dryer 1 is switched to the regeneration mode (S200), whereas if the timer time is less than 300 seconds, the engine is not sufficiently warmed and thus the air dryer 1 needs to be thawed, such that the air dryer control method enters the air pressure re-detecting step of S120.

In the CUT-IN pressure determining step (S130), the detected pressure of the air tank is used. To the present end, the following CUT-IN pressure determination formula is applied.

CUT-IN pressure determination formula: Pressure of air tank>D

Here, the "pressure of the air tank" is the detected pressure of the air tank, and the "E" applies about 8.3 bars as a threshold.

As a result, if the detected pressure of the air tank is equal to or greater than 8.3 bar, the valve operating step (S100), the air pressure re-detecting step (S110), and the engine state determining step (S110) are repeated, whereas if the detected pressure of the air tank is lower than 8.3 bar, the air dryer control method returns to the valve non-operating step (S70) and thus the air dryer 1 is switched to the CUT-OUT filling section control (S20-2A).

For the winter season repeating operation control (S70-1 to S130-1), the controller 50 divides the CUT-OUT filling section control (S20-2A) into a valve non-operating step of S70-1, an air pressure detecting step of S80-1, and a CUT-OUT pressure determining step of S90-1, and divides the CUT-IN consumption section control (S20-2B) into a valve operating step of S100-1, an engine state determining step of S110-1, an air pressure re-detecting step of S120-1, and a CUT-IN pressure determining step of S130-1.

Therefore, the CUT-OUT filling section control (S20-2A) and the CUT-IN consumption section control (S20-2B) of the cold weather repeating operation control (S70-1 to S130-1) are the same as the performing step of the CUT-OUT filling section control (S20-2A) and the CUT-IN consumption section control (S20-2B) of the winter season repeating operation control (S70 to S130).

However, the cold weather repeating operation control (S70-1 to S130-1) may apply the elapsed determination formula as follows after the engine starting in the engine state determining step (S110-1), and thus has a slight difference from the elapsed determination formula after the engine starting in the engine state determining step (S110) of the winter season repeating operation control (S70 to S130).

Elapsed determining formula after engine starting of winter season repeating operation control (S70-1 to S130-1): Timer time>t Here, the "timer time" is the sustain time of engine ON of the engine stop after the ignition ON, and the "t" applies about 500 seconds as a threshold.

Therefore, there is a difference in that the cold weather repeating operation control (S70-1 to S130-1) makes the cold mode operation of the air dryer 1 long about 200 seconds in consideration of the relatively lower air temperature with respect to the winter season repeating operation control (S70 to S130).

Figure 5:
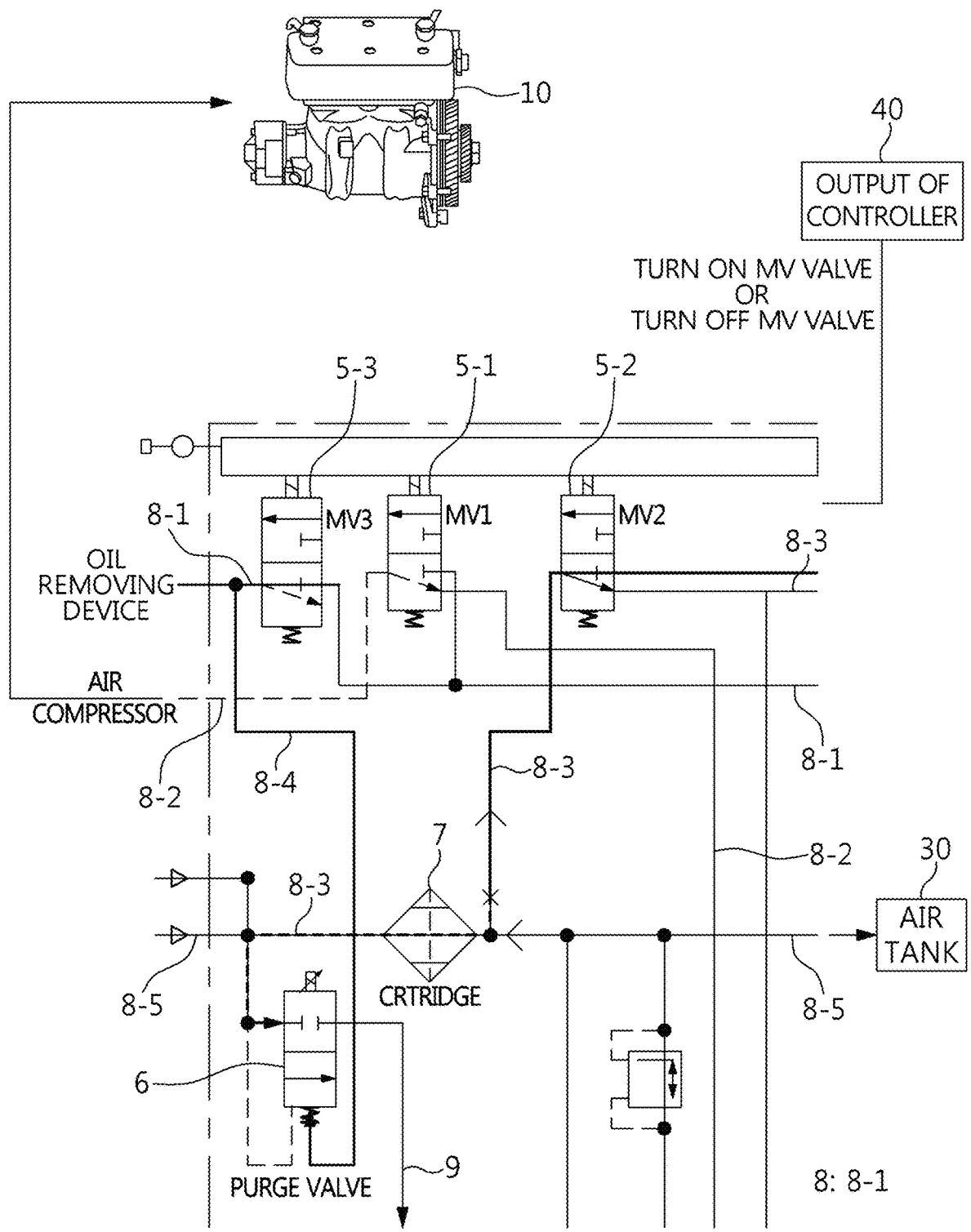
FIG. 5 is a diagram illustrating a cold mode operation state of the heaterless air dryer according to an exemplary embodiment of the present invention.

FIG. 5 is a cold mode operation of the air dryer 1, in which when air is supplied for 300 seconds through the air compressor 10 at −10° C., the temperature of the components in the air dryer reaches a normal temperature state, and the cold mode operation is based on test results without problems in operation.

As shown, the controller 50 performs the CUT-OUT filling section control (S20-2A) until the CUT-OUT pressure of the air tank 40 is arrived while keeping the MV1 valve 5-1, the MV2 valve 5-2, and the MV3 valve 5-3 off. In the instant case, the CUT-OUT filling section control (S20-2A) first confirms the air temperature portion and performs the air supply for 300 seconds at 0 to −10° C. and for 500 seconds for −10° C. or less.

Thereafter, the controller 50 turns on the MV1 valve 5-1 and the MV2 valve 5-2 while keeping the MV3 valve 5-3 off to perform the CUT-IN consumption section control (S20-2B) until the CUT-OUT pressure which is the relatively high temperature/high pressure reaches the CUT-IN pressure. In the instant case, the CUT-IN consumption section control (S20-2B) performs the regeneration function after 300 seconds or 500 seconds after the CUT-OUT pressure is arrived by the air compression when the pressure of the air tank 40 is equal to or lower than the CUT-OUT pressure.

Accordingly, the turn on of the MV1 valve 5-1 in the CUT-IN consumption section control (S20-2B) opens the valve-air compressor line 9-2 connected to the air compressor 10 while keeping the air compressor 10 in a non-operating state, and the turn on of the MV2 valve 5-2 opens the valve-cartridge line 8-3 connected to the cartridge 7 and the purge valve 6. As a result, the purge valve 6 is warmed by the heat of the compressed air filled in a cold operation for a predetermined time when the filling ends and the CUT-OUT pressure of about 9.7 bars is arrived, such that the purge valve 6 rises to the normal operation temperature. In the instant case, the predetermined time means a process of consuming the pressure of the air tank 40 up to the CUT-IN pressure of about 8.3 bars and performing the filling without performing the regeneration.

Meanwhile, referring back to FIG. 2 and FIG. 3, the controller 50 performs the switching to the regeneration mode of S200 at the time of the entry of the regeneration mode of S40-1 when the air temperature is higher than 0° C. in the air temperature determining step (S40) under the winter season condition control (S20-1) or the air temperature is equal to or lower than 0° C. in the engine OFF elapsed time determining step (S50) and the timer time is less than 15 minutes. In the instant case, the regeneration mode entry determination (S40-1) is made of as the arrival of the set time.

Figure 6:
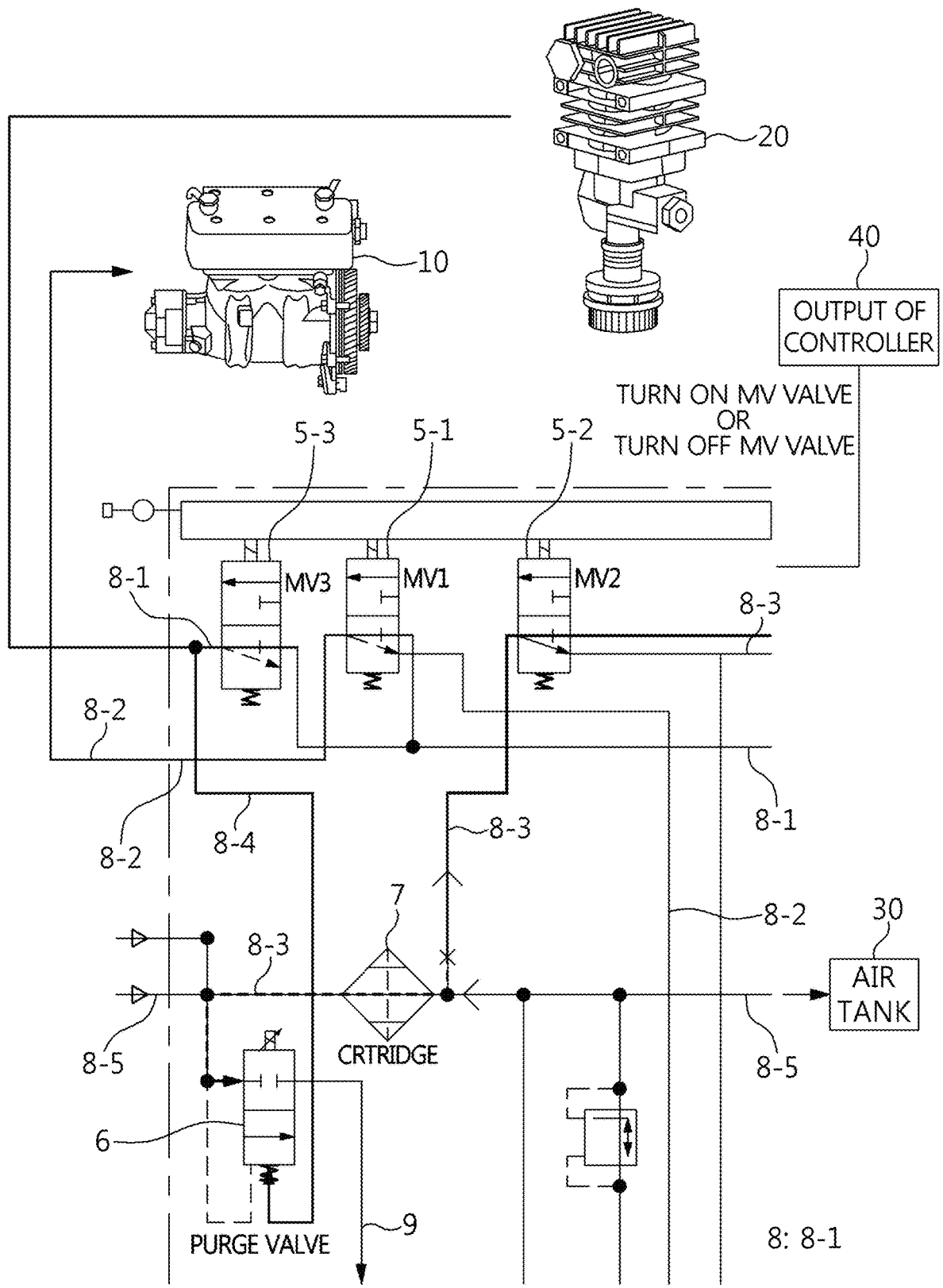
FIG. 6 is a diagram illustrating a regeneration mode operation state of the heaterless air dryer according to an exemplary embodiment of the present invention.

FIG. 6 is a regeneration mode operation of the air dryer 1, and the controller 50 switches all of the MV1 valve 5-1, the MV2 valve 5-2 and the MV3 valve 5-3 to be turned on. As a result, the valve-oil removing device line 8-1 is connected to the oil removing device 20, the valve-air compressor line 8-2 is connected to the air compressor 10, and the valve-cartridge line 8-3 is connected to the drain line 9 from the cartridge 7 through the purge valve 6, and the purge valve line 8-4 is connected to the purge valve 6. In the instant case, the operation of the MV1 valve 5-1 causes the air compressor 10 to be in the non-operating state.

Therefore, the regeneration mode raises the purge valve 6 to the normal operating temperature for a predetermined time through the heat of the air to be filled, such that the operation of the purge valve 6 damages the O-ring, resolving the operation risk at the time of the cold operation which shortens the life span. The regeneration mode involves an effect of blowing out the emulsion accumulated at the bottom of the cartridge with the compressed air by connecting the valve-cartridge line 8-3 to the drain line 9.

Meanwhile, referring back to FIG. 2 and FIG. 3, if the controller 50 is not in the regeneration mode (S40-1), the controller 50 performs the switching to the filling mode (S40-2, S200) following the filling mode entry determination (S40-2). In the instant case, the filling mode entry determination (S40-2) is made by the detected pressure of the air tank (40).

Figure 7:
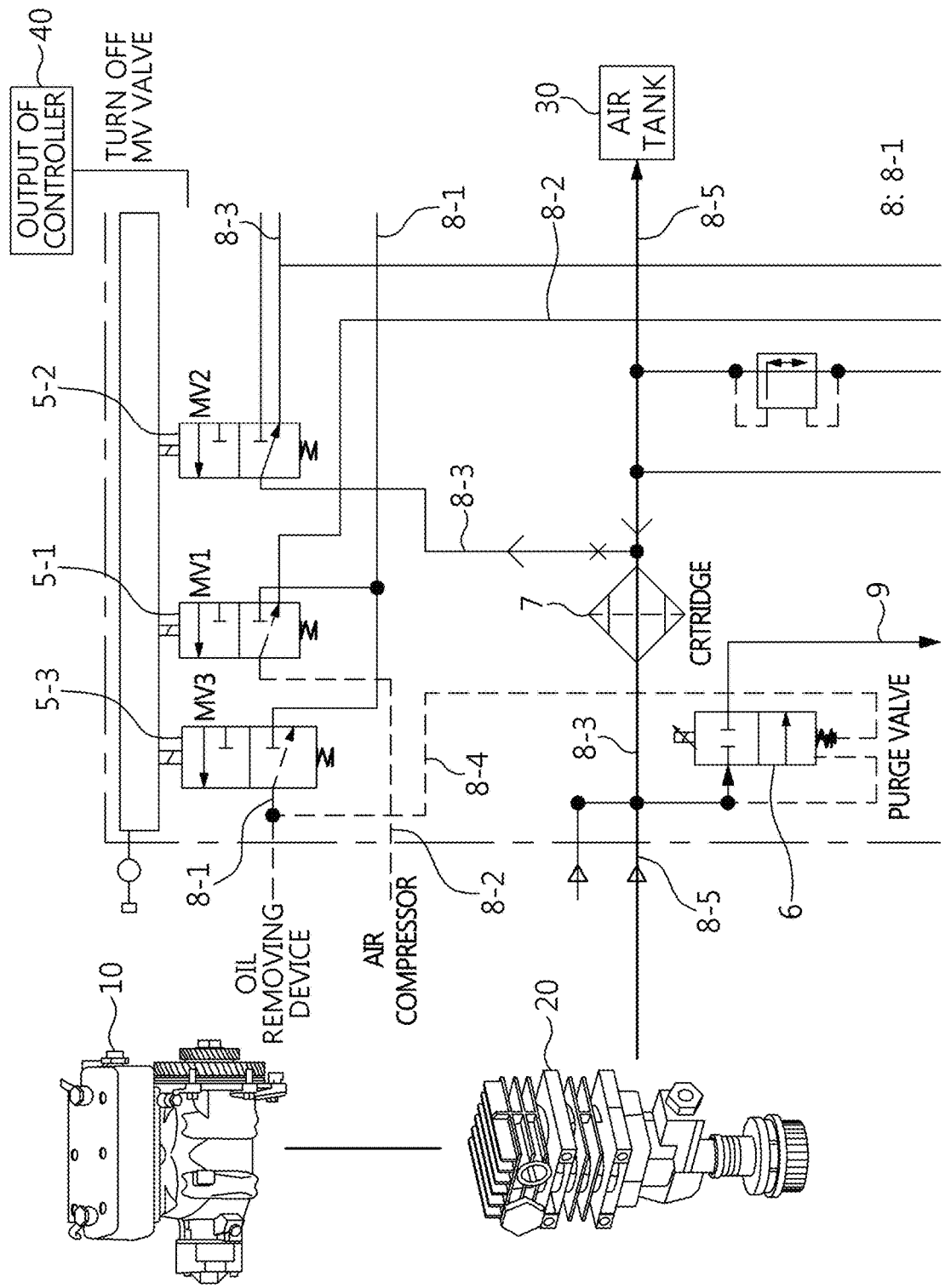
FIG. 7 is a diagram illustrating a filling mode operation state of the heaterless air dryer according to an exemplary embodiment of the present invention.

Referring to FIG. 7, the controller 50 switches all of the MV1 valve 5-1, the MV2 valve 5-2, and the MV3 valve 5-3 to be turned off, such that the air tank line 8-5 of the air dryer 1 connects the air compressor 10 to the oil removing device 20 and the air tank 40. As a result, the high-temperature/high-pressure compressed air generated in the air compressor 10 is primarily purified by the oil removing device 20, and then is secondarily purified in the cartridge 7 of the air dryer 1 and is filled in the air tank 40.

As described above, if the controller detects the winter season condition in which the air temperature is lowered to the freezing temperature while detecting the engine starting, the air dryer control method using the air dryer 1 according to the exemplary embodiment forms the path switching of the air path 8 in which the flow of compressed air is changed by the turn on/off control of the MV1 valve 5-1, the MV2 valve 5-2, and the MV3 valve 5-3 of the air dryer 1 and includes the cold mode in which the internal to the air dryer 1 is warmed with the high-temperature/high-pressure compressed air filled in the air tank 40 by the path switching to thaw the purge valve 6 using the compressed air in winter, deleting the heater, discharging the emulsion of the cartridge using the compressed air in the existing regeneration mode.

The heaterless air dryer of the present invention performs the cartridge regeneration and the thawing in winter by use of the high temperature/high pressure compressed air, realizing the following actions and effects.

First, the heaterless air dryer without the heating element may be realized by reaching room temperature with the compressed air. Second, since the heater disposed in the air dryer may be eliminated, the cost reduction effect is great. Third, it is possible to independently develop the electronic air processing unit (EAPU) by adding the cold mode for the thawing in winter to the operation control logic of the air dryer, being differentiated from the existing logic. Fourth, the air management system may be implemented by the heaterless air dryer to reduce the power consumption. Fifth, it is possible to improve the commerciality of the commercial vehicle using the compressed air as the energy source for the brake or the like by the power saving function of the air management system to which the heaterless air dryer is applied.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air dryer control method, comprising:
a cold mode in which a controller is configured to perform a winter season condition control in which air temperature is lowered to freezing temperature when an engine starting is detected, and is configured to perform a winter season thawing control in which compressed air introduced into a valve control of an air dryer warms a purge valve of the air dryer,
wherein the winter season condition control is performed by detecting an air pressure, air temperature, and an engine revolution per minute (RPM) as winter season condition factors after the engine starting, determining a winter season thawing control entry for the winter season thawing control at the air temperature, and determining the winter season thawing control entry as an engine OFF elapsed time before the engine starting is determined.

2. The air dryer control method of claim 1, wherein the compressed air is air in which a temperature of the air is higher than a predetermined temperature and a pressure of the compressed air is higher than a predetermined pressure and wherein the compressed air is filled in an air tank via the air dryer.

3. The air dryer control method of claim 1, wherein the engine OFF elapsed time is determined after the air temperature satisfies the winter season thawing control entry.

4. The air dryer control method of claim 3, wherein the air temperature is compared with a first threshold confirming the freezing temperature and is temperature lower than the first threshold.

5. The air dryer control method of claim 3, wherein the engine OFF elapsed time is compared with a second threshold set by counting a timer time and is equal to or greater than the second threshold.

6. The air dryer control method of claim 1, wherein the winter season thawing control divides the air temperature detected after the engine starting by a threshold, and performs a winter season repeating operation control when the air temperature is higher than the threshold and performs a cold weather repeating operation control when the air temperature is equal to or lower than the threshold.

7. The air dryer control method of claim 6, wherein each of the winter season repeating operation control and the cold weather repeating operation control includes a CUT-OUT filling section control which raises a pressure of the compressed air to a CUT-OUT pressure at which filling of an air tank stops and a CUT-IN consumption section control which drops the pressure of the compressed air to a CUT-IN pressure at which the filling of the air tank starts.

8. The air dryer control method of claim 7, wherein the CUT-OUT filling section control controls a first valve, a second valve, and a third valve of the air dryer to be turned off to switch an air path and is performed until an air pressure detection value reaches the CUT-OUT pressure, and the CUT-IN consumption section control switches the first valve and the second valve to be turned on and controls the third valve to be turned off to switch the air path and is performed until the air pressure detection value reaches the CUT-IN pressure before an elapsed time after the engine starting at a time of detecting the engine starting reaches the threshold.

9. The air dryer control method of claim 8, wherein the winter season repeating operation control and the cold weather repeating operation control for the CUT-IN consumption section control has a difference in the elapsed time after the engine starting.

10. The air dryer control method of claim 9, wherein the elapsed time after the engine starting is longer in the cold weather repeating operation control than in the winter season repeating operation control.

11. The air dryer control method of claim 8, wherein, when the elapsed time after the engine starting reaches the threshold, a regeneration mode for the air dryer is performed.

* * * * *